July 15, 1947.  C. M. HAMBLIN  2,423,974
CONVECTION HEATING APPARATUS
Filed Jan. 21, 1943

CLYDE M. HAMBLIN,
INVENTOR

BY

ATTORNEY

Patented July 15, 1947

2,423,974

UNITED STATES PATENT OFFICE 2,423,974

CONVECTION HEATING APPARATUS

Clyde M. Hamblin, Washington, D. C., assignor of one-fifth to Eva F. Hamblin, one-fifth to Helen Lois Hamblin, and one-fifth to Barbara Hamblin, all of District of Columbia Application January 21, 1943, Serial No. 473,052

2 Claims. (Cl. 98—38)

(Granted under the act of March 3, 1883, as amended April 30, 1928; 370 O. G. 757)

The invention relates to heating apparatus and more particularly to such apparatus operating by convection.

It is an object of my invention to provide means for limiting and regulating the difference between the temperature of the air leaving the heating or cooling coils and the temperature of the space or room served.

In the Figs. 1 and 2 of the drawings is shown a particular application of this type of heating apparatus commercially known as a convector. This particular exemplary embodiment of the invention consists of a cabinet in which is placed a coil or heat transfer element. Air enters at or near the bottom of the cabinet below the heating element. This air is warmed in passing over the surfaces comprising the heating element. The increase in temperature of the air causes it to rise and leave the cabinet through an opening near the top of the cabinet. The movement of air by convection or the "chimney effect" thus created gives to this type of apparatus its generally accepted name of convector.

In applying this type of heating apparatus to naval use, several inherent faults general to this convector type of apparatus are accentuated.

On naval vessels steam is usually supplied to the heating elements of convectors at a much higher temperature than is the case with commercial units. A vessel of the navy in the discharge of its regular duties may travel from a temperate climate to a very cold one in the course of only a few days. Thus a unit of this type, built for low temperature steam or for hot water, as a heating medium and selected for a particular climatic condition, suffers in its heating effectiveness when applied to shipboard use.

Another object of the convector of the present invention is to provide a means by which induced air current or currents may be utilized to lower the outlet temperature of the air stream flowing from the apparatus.

A further object is to provide a means of altering the amount of air passing over the surfaces of the heating element, thus altering the heat output of the unit to meet varying requirements.

A further object is to provide a means to easily adjust the proportion between heated air and induced air for the dual purpose of decreasing the temperature of air leaving the unit and of varying the total heating capacity or heat output of the unit.

The exact nature of an exemplary specific embodiment of the invention will be better understood as the description proceeds herein.

Other objects and advantages of the invention will be more apparent from the ensuing description having reference to the drawings which are exemplary and which show one embodiment of the invention.

In the accompanying drawings forming part of the present specification:

Figure 2:
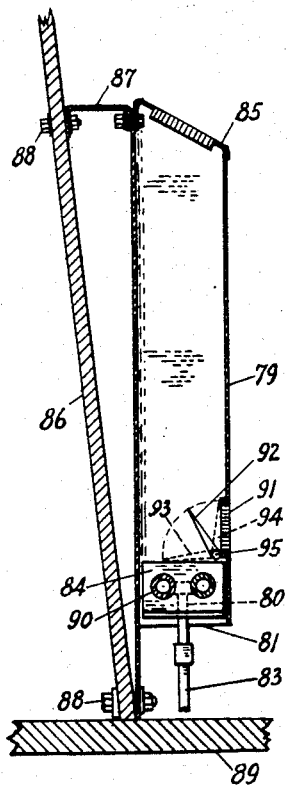
Fig. 2 is a section on line 2—2 of Fig. 1.
Figure 1:
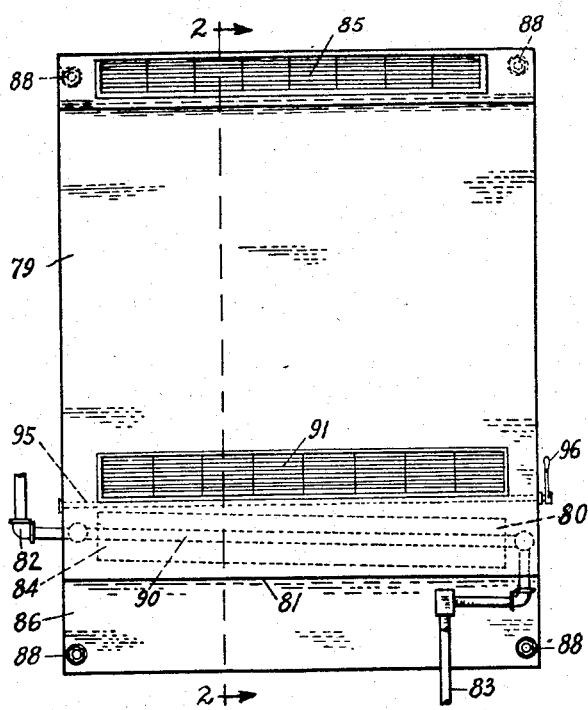
Fig. 1 shows a form of apparatus embodying the present invention.

In the drawings is shown an embodiment of the present invention which relates to improvements in heating apparatus commercially known as convectors.

Referring to the drawings, the illustrated embodiment of the invention comprises a cabinet 79 made of suitable material such as sheet steel. A heat transfer element 80 is interposed in the interior of this cabinet in such a manner that air entering through the open bottom 81 or through an opening near the bottom and below the heating element 80 of the cabinet will pass over the surfaces comprising the heating element.

The preferred form of heating element is the extended surface type. In this instance this heating element is comprised of hollow tubes 90 through which steam or other heating medium is caused to pass, entering at 82 and leaving by passage 83. The tubes have affixed to them a multiplicity of flat plates or fins 84 which act as heat transfer surfaces absorbing the heat given up by the steam and imparting this heat to the air which lies against the surface. Thus a current of moving air is set up by convection, which current of air leaves the cabinet through the opening 85 at or near the top of the cabinet.

In some forms of conventional units an adjustable damper (not shown) is provided at the opening 85 to adjustably control the heat output by controlling the amount of air leaving the cabinet. This method of heat control has the disadvantage that as the amount of air leaving the cabinet is reduced, the temperature of the air wtihin the cabinet 79 increases.

Referring further to the drawings, 86 represents a bulkhead or partition to which the apparatus is fastened by suitable clips 87 and/or bolts 88. The deck or floor is represented by 89. The cabinet may be mounted on legs or otherwise supported in position, instead of being wall mounted as shown, in some instances when same is found desirable.

The portions of the apparatus up to this point in the description represent a conventional unit of this type. The departure from the conventional unit consists of the use of a third opening for air passage, represented in the drawings by grilled opening 91 in the front of the cabinet, immediately above the heating element 80 and one or more dampers 92, for controlling the amount of air entering the opening 91. The damper or dampers 92 are so disposed when open, as to induce an inward flow of cool air through opening 91. This entering cool air mixes with the hot air leaving the top of heater element 80, through opening 85, and thus reduces the temperature of the air moving upward through the cabinet and issuing from opening 85. The entrance of air above the heating element and the cooling of the air within the cabinet reduces the "stack" or chimney effect on the heating element 80 and consequently reduces the flow of air through the element 80 and the heat output of the unit.

The preferred arrangement is to have additional control of the heat output by having the damper or dampers 92 hinged at 95 and movable to any intermediate position between fully open and fully closed positions shown at 93 and 94. Damper 92 is of such size and so arranged that as it is moved away from a position such as 94 it will admit air through opening 91, and as damper 92 is set at some intermediate position nearer to 93, it partially restricts the upward movement of air through heater element 80, thus reducing the heat output.

A lever 96 or other means affixed to the valve or damper 92 is used to revolvably change or move the position of said valve or damper 92 as is at once understood. This adjusting or changing means may be manual or may be automatically controllable by any one or more of the conventional means (not shown) in general use for this purpose.

While the invention is illustrated as applied particularly to a conventional unit of the convection type, and even more particularly to such apparatus as used on shipboard, it is not confined thereto, but is intended to cover any other uses or applications to which it may be readily adaptable in general or special use.

The invention described herein may be manufactured and used by or for the Government of the United States of America for governmental purposes without the payment of any royalties thereon or therefor.

I claim:

1. In a natural convector, a cabinet enclosing heating means near the bottom thereof for causing a natural convection current of heated air through the cabinet, an air inlet opening in the lower part of said cabinet upstream of said heating means, an air outlet opening in the upper part of said cabinet downstream of said heating means, an air inlet opening in said cabinet downstream of said heating means and between said air outlet opening and said heating means, an adjustable damper for said opening having an edge pivotally mounted to the cabinet adjacent the upstream edge of said last-named air inlet opening and adapted to swing inwardly in said cabinet to restrict the air passage downstream of said heating means thereby increasing the velocity of the natural convection current of heated air in said passage to induce an airflow inwardly through said last-named air inlet opening and to adjustably control the heat output and outlet air temperature of the convector over a wide range, said cabinet being closed in the heating means enclosing portion thereof between the lower air inlet opening upstream of said heating means and said second-mentioned air inlet opening downstream of said heating means.

2. In a natural convector, a cabinet enclosing heating means near the bottom thereof for causing a natural convection current of heated air through the cabinet, an air inlet opening in the lower part of said cabinet upstream of said heating means, an air outlet opening in the upper part of said cabinet downstream of said heating means, an air inlet opening in said cabinet downstream of said heating means and between said air outlet opening and said heating means, an adjustable damper for said opening having an edge pivotally mounted to the cabinet adjacent the upstream edge of said last-named air inlet opening and adapted to swing inwardly in said cabinet to restrict the air passage downstream of said heating means thereby increasing the velocity of the natural convection current of heated air in said passage to induce an airflow inwardly through said last-named air inlet opening and to adjustably control the heat output and outlet air temperature of the convector over a wide range, said cabinet being closed in the heating means enclosing portion thereof between the lower air inlet opening upstream of said heating means and said second-mentioned air inlet opening downstream of said heating means, said natural convector cabinet being constructed to operate entirely by the natural convection current of heated air, and said cabinet being free from any supplemental forced air inlet into said cabinet producing an ejector effect.

CLYDE M. HAMBLIN.

REFERENCES CITED

The following references are of record in the file of this patent:

UNITED STATES PATENTS

| Number | Name | Date |
| --- | --- | --- |
| 1,296,968 | Klein | Mar. 11, 1919 |
| 2,158,758 | Lintern | May 16, 1939 |
| 2,231,826 | Foss, 2d | Feb. 11, 1941 |
| 1,878,012 | Stacey et al. | Sept. 20, 1932 |
| 2,215,901 | Christman | Sept. 24, 1940 |
| 1,845,243 | Cox | Feb. 16, 1932 |
| 2,314,569 | Baker | Mar. 23, 1943 |
| 509,332 | Smith | Nov. 21, 1893 |
| 2,238,172 | Jovanovitz | Apr. 15, 1941 |
| 1,995,667 | Cano | Mar. 26, 1935 |
| 2,345,536 | Keep | Mar. 28, 1944 |
| 440,229 | Keith | Nov. 11, 1890 |
| 920,918 | Cooke | May 11, 1909 |

FOREIGN PATENTS

| Number | Country | Date |
| --- | --- | --- |
| 379,430 | Great Britain | Sept. 1, 1932 |
| 341,460 | Great Britain | Jan. 16, 1931 |
| 15,335 | Great Britain | A. D. 1884 |
| 426,731 | France | May 10, 1911 |